July 26, 1927.
R. J. COALE
1,637,102
AUXILIARY COOLER FOR RADIATORS
Filed Sept. 4, 1924
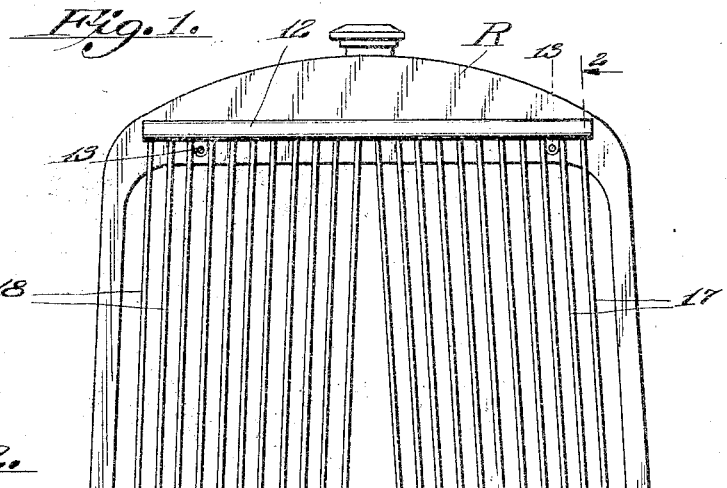
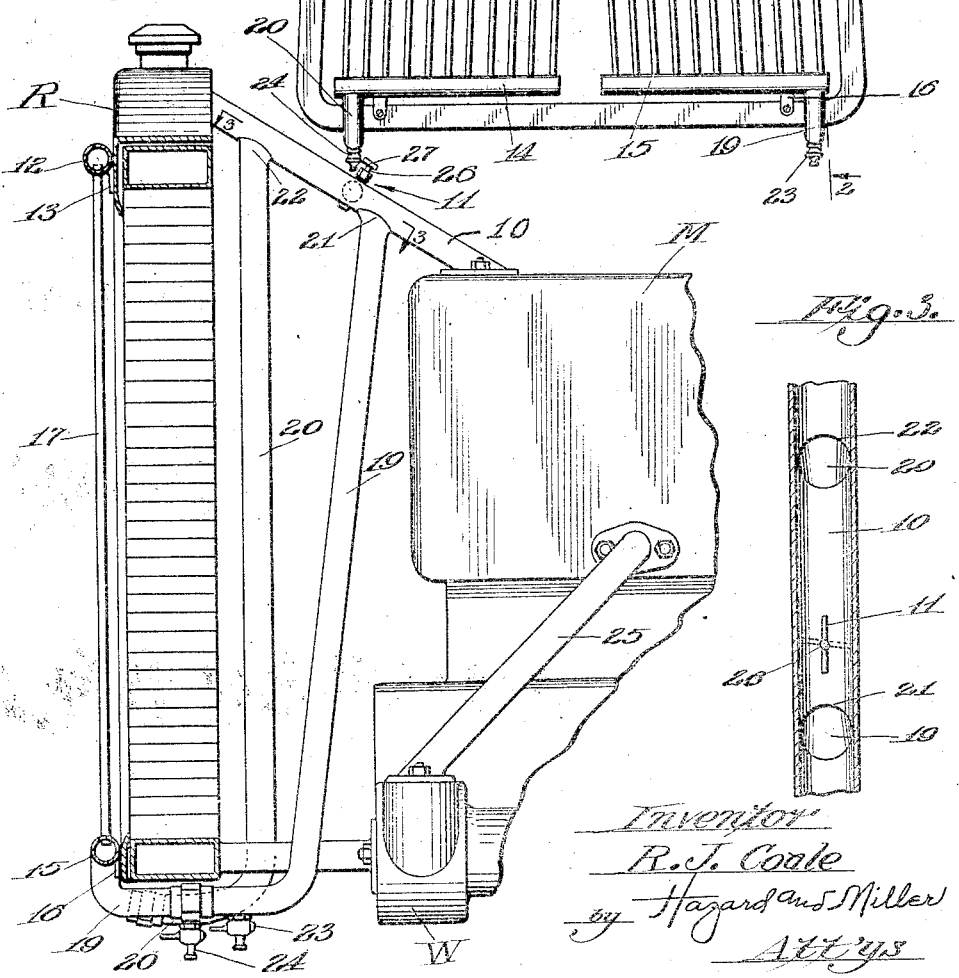
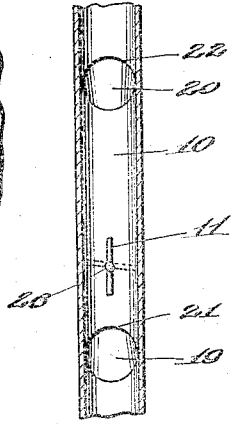
Inventor
R. J. Coale
by Hazard and Miller
Att'ys Patented July 26, 1927.

1,637,102

UNITED STATES PATENT OFFICE.

ROBERT J. COALE, OF LOS ANGELES, CALIFORNIA, ASSIGNOR OF ONE-HALF TO HENRY KIMBER, OF LOS ANGELES, CALIFORNIA.

AUXILIARY COOLER FOR RADIATORS.

Application filed September 4, 1924. Serial No. 735,831.

This invention relates to improvements in water cooling systems for internal combustion engines, and is especially designed to cooperate with the water cooling system upon an automobile.

It is a broad primary object of the invention to provide a device attachable to the radiator of an automobile which will increase the radiating surface.

The radiators upon automobiles are primarily designed so as to give the amount of radiating surface which will efficiently cool the water used to cool the motor so that when the automobile is being driven under normal conditions, that is. upon substantially level road, the water will reach a predetermined degree of temperature so that the motor will operate most efficiently. The motor of the automobile will not operate efficiently if the water in the circulating system is kept too cool or too hot.

My invention relates to an auxiliary cooler adapted to be attached to the radiator of an automobile, which is to be used when the automobile is going up grade for any considerable distance. This improved auxiliary cooler is very advantageous where the automobile is being driven in the mountains, where long grades which are comparatively steep are frequently encountered.

Another object of the invention is to provide such a cooler which is attachable to a radiator and which may be connected or disconnected so that when the automobile is being driven up grade, the auxiliary cooler may be connected keeping the water in the cooling system at the desirable degree of temperature. Obviously, when the automobile again reaches a comparatively level stretch of road, if the auxiliary cooler were left connected, the water in the cooling system would be kept too cool for the motor to run efficiently. Means is therefore provided for turning off or disconnecting the auxiliary cooler from the radiator when driving on level ground so that only the radiator, which was originally provided upon the automobile, is then in use.

With the foregoing and other objects in view which will be made manifest in the following detailed description and pointed out in the appended claims, reference is had to the accompanying drawings for an illustrative embodiment of the invention, wherein:

Figure 1 is a front elevation of a radiator upon which my improved auxiliary cooler has been applied, Fig. 2 is a vertical section taken substantially upon the line 2—2 of Fig. 1, and Fig. 3 is a section taken substantially upon the line 3—3 of Fig. 2.

Referring to the accompanying drawings, wherein similar reference characters designate similar parts throughout, an automobile provided with a motor M having a discharge pipe 10 leading upwardly and forwardly from the water jacket (not shown) of the motor M to the radiator R, has a valve generally designated at 11 inserted in the discharge pipe 10. Upon the front of the radiator R, a horizontal pipe 12 is secured in any suitable manner as by brackets 13 adjacent the top of the radiator R. A pair of horizontal pipes 14 and 15 are secured as by brackets 16 upon the front face of the radiator R adjacent the bottom thereof. A series of substantially vertical tubes 17 connect the horizontal pipe 15 with the upper horizontal pipe 12. A similar series of tubes 18 connect the pipe 14 with the upper horizontal pipe 12. Connecting pipes 19 and 20 extend beneath the radiator R and are connected to the horizontal pipes 15 and 14 respectively. The connecting pipes 19 and 20 are also connected to the discharge pipe 10, as at 21 and 22. Suitable valves or pet-cocks 23 and 24 may be provided in the connecting pipes 19 and 20 permitting water to be drained from the auxiliary cooler. The automobile may be provided with a water pump W, which receives water from the radiator R and pumps it through a pipe 25 into the water jacket of the motor M.

The operation of the device is as follows: When the automobile is being driven upon substantially level road, the valve 11 is turned so that water may pass from the water jacket of the motor M directly through the discharge pipe 10 into the radiator R, passing therethrough and circulated by the water pump W. When the automobile is to be driven up a long grade, the valve 11 is turned so as to stop the passage through the discharge pipe 10. When the valve is turned in this position, water is directed from the discharge pipe 10 downwardly through the connecting pipe 19, passing into the horizontal pipe 15 upwardly through the tubes 17, through the pipe 12 downwardly through the tubes 18 into the pipe 14 and upwardly into the discharge pipe 10 through the connecting pipe 20. Upon passing into the discharge pipe 10, the water may then pass through the radiator R and be forced back into the water jacket of the motor M by means of the water pump W as before.

By directing the water through the auxiliary cooler, it is seen that additional radiating surface is provided so that the water is efficiently cooled before returning to the water jacket of the motor.

In the preferred construction, the tubes 17 are small, but are of such a number that their combined internal cross sectional area is equal to, or greater than, the cross sectional area of the discharge pipe 10, so that water passing through the tubes 17 will flow slowly permitting it to be easily cooled. The tubes 18 are preferably of the same size for the same reason.

The valve 11 may constitute a simple butterfly valve which is interposed between the points of connection 21 and 22 of the connecting pipes 19 and 20. When the valve 11 is turned to open position, there is very little, if any, tendency for water to pass downwardly through the connecting pipe 19, the hydrostatic pressure being substantially the same in both of the connecting pipes 19 and 20. I contemplate the use of a thermostatic control for the valve 11; also the valve 11 may be operated by any suitable set of links and levers, enabling it to be turned from the driver's compartment of the automobile. However, for purposes of illustration, a stem 26 is secured to the valve 11 which carries a handle 27 constituting means for operating the valve 11.

It is to be understood that various changes in the detail of construction may be made without departing from the spirit or scope of the invention as defined by the appended claims.

I claim:

1. The combination with a radiator of an automobile, an auxiliary radiator, connecting pipes connecting the auxiliary radiator to the pipe connecting the water jacket to the automobile radiator of the automobile motor, and a valve disposed in the pipe connecting the water jacket to the automobile radiator between the points of connection of said connecting pipes, whereby water may pass directly from the water jacket into the automobile radiator or be caused to flow through the auxiliary radiator and then into the automobile radiator.

2. In combination with an automobile radiator, a pair of horizontal pipes mounted forwardly of the automobile radiator, a plurality of vertical tubes connecting said pipes, means providing connecting conduits connecting said horizontal pipes to the pipe connecting the water jacket of the automobile motor to the automobile radiator, and a valve mounted upon the pipe connecting the water jacket to the automobile radiator between the points of connection of said connecting conduits, whereby water may be allowed to pass from the water jacket directly into the automobile radiator or to be caused to flow through said pipes and tubes and then enter the automobile radiator.

3. In combination with a radiator of an automobile, a horizontal pipe secured to the front of the radiator adjacent the top thereof, a pair of horizontal pipes secured to the front of the radiator adjacent the bottom thereof, substantially vertical tubes connecting said pair of horizontal pipes to the first mentioned horizontal pipe, connecting pipes connecting each of said pair of pipes to separate points upon the discharge pipe connecting the water jacket to the radiator, and a valve disposed in said discharge pipe between the points of connection of said connecting pipes, whereby water may be directed through said tubes or may be allowed to pass directly into the radiator.

4. In combination with a radiator of an automobile, a horizontal pipe secured to the front of the radiator adjacent the top thereof, a pair of horizontal pipes secured to the front of the radiator adjacent the bottom thereof, substantially vertical tubes connecting said pair of horizontal pipes to the first mentioned horizontal pipe, connecting pipes connecting each of said pair of pipes to separate points upon the discharge pipe connecting the water jacket to the radiator, a valve disposed in said discharge pipe between the points of connection of said connecting pipes, whereby water may be directed through said tubes or may be allowed to pass directly into the radiator, and means for operating said valve.

In testimony whereof I have signed my name to this specification.

ROBERT J. COALE.